United States Patent
Borden

[11] Patent Number: 5,821,296
[45] Date of Patent: Oct. 13, 1998

[54] POLYURETHANE-POLYESTER HYBRID RESIN SYSTEM HAVING IMPROVED STABILITY

[75] Inventor: Keith A. Borden, McCandless Township, Allegheny County, Pa.

[73] Assignee: Aristech Chemical Corporation, Pittsburgh, Pa.

[21] Appl. No.: 636,111

[22] Filed: Apr. 22, 1996

[51] Int. Cl.$^6$ .................... C08J 3/00; C08K 3/20; C08L 75/00; C08F 20/00
[52] U.S. Cl. .................... 524/590; 524/589; 524/248; 524/249; 524/259; 524/260; 524/340; 524/347; 524/349; 524/351; 525/28; 525/440; 525/445
[58] Field of Search .................... 524/589, 590, 524/248, 249, 259, 260, 340, 347, 351, 349; 525/28, 440, 445

[56] References Cited

U.S. PATENT DOCUMENTS

| | | | |
|---|---|---|---|
| 4,083,890 | 4/1978 | Drake et al. | 260/836 |
| 4,413,105 | 11/1983 | Koenig | 525/482 |
| 5,153,261 | 10/1992 | Brooks | 525/28 |
| 5,296,544 | 3/1994 | Heise | 525/28 |
| 5,296,545 | 3/1994 | Heise | 525/28 |
| 5,302,634 | 4/1994 | Mushovic | 523/219 |
| 5,344,852 | 9/1994 | Brooks et al. | 521/99 |
| 5,447,921 | 9/1995 | Borden et al. | 521/99 |
| 5,482,648 | 1/1996 | Borden et al. | 252/182.2 |

*Primary Examiner*—Patrick D. Niland
*Attorney, Agent, or Firm*—Robert R. Gavlik

[57] ABSTRACT

The present invention is drawn to a polyurethane-polyester hybrid resin system wherein the components of the system have improved shelf life stability. The resin system comprises an A-Side comprising a multifunctional isocyanate and a free radical initiator. The hybrid resin system also comprises a B-Side comprising a hydroxyl-terminated unsaturated polyester polyol, an ethylenically unsaturated monomer, a polyurethane catalyst, a polymerization inhibitor, and optionally a peroxide promoter, chain extender and filler. The B-Side polymerization inhibitor of the present invention comprises substituted hindered phenol-type compounds with ring substituents producing activated benzylic hydrogens, nitrophenols with or without benzylic-type substituents, naphthoquinones, stabilized radical compounds, and mixtures thereof.

8 Claims, No Drawings

POLYURETHANE-POLYESTER HYBRID RESIN SYSTEM HAVING IMPROVED STABILITY

TECHNICAL FIELD

Background

It is well understood in the art that polyurethane and unsaturated-polyester resins can be combined to form a hybrid system resulting in superior properties not inherent in either constituent alone. These hybrid resins are typically tougher than unsaturated polyester resins, and stronger, stiffer and less expensive than typical polyurethane resins. These hybrid resins generically comprise a hydroxyl-terminated unsaturated polyester polyol, an ethylenically unsaturated monomer and a multifunctional isocyanate. Examples of typical prior art hybrid systems are set forth in U.S. Pat. Nos. 5,153,261; 5,296,544; 5,296,545, and 5,302,634.

Typically, these resins are provided as a two-component system. Common terminology in the art is to refer to these as an "A-Side" component, containing the multifunctional isocyanate and usually a free radical initiator, and a "B-Side" component, usually containing the hydroxyl-terminated unsaturated polyester polyol and ethylenically unsaturated monomer, as well as a polyurethane catalyst, a peroxide promoter, chain extender and filler and optionally water.

More recently, Brooks et al, in U.S. Pat. No. 5,344,852 describes a water blown unsaturated polyester-polyurethane hybrid resin foam formed by contacting an A-Side polyfunctional isocyanate compound and a free radical initiator, and a B-Side composition having (1) an ethylenically unsaturated monomer in which a conventional polyester polyol is dissolved, (2) a polyamine compound, and (3) water.

U.S. Pat. Nos. 5,447,921 and 5,482,648 disclose an A-Side comprising a multifunctional isocyanate, a peroxy compound capable of initiating free radical polymerization at room temperature and a high temperature peroxy compound activated by the exotherm from the initial reaction, and a B-Side comprising a hydroxyl-terminated unsaturated polyester polycl dissolved in an ethylenically unsaturated monomer, an amine compound having two or more primary or secondary amine groups, and water.

An inherent problem with these prior art systems is the storage stability of the blended polyol containing component. The carbon-carbon double bonds in the polyol component, the unsaturated polyester polyol dissolved in ethylenically unsaturated monomer, are highly susceptible to premature polymerization, and this typically necessitates the use of polymerization inhibitors. Typical inhibitor packages contain between one and three quinone-type inhibitors. These inhibitor packages are known to impart storage stability to polyester polyols. However, these quinone-type inhibitors are also known to be ineffective in mixtures containing amine-type additives, such as urethane or foam catalysts and chain extenders, in combination with an unsaturated polyol.

For example, a polyol containing a standard quinone inhibitor package, without any amine components may have a 70° C. storage stability of twenty-nine days. The same polyol with amine-type additives will have a storage stability of one to two days. Analytical analysis shows the amine compounds react with the quinone-type structures to form entities that are incapable of functioning as polymerization inhibitors.

SUMMARY OF THE INVENTION

The present invention relates to a storage stable unsaturated polyester polyol containing component of a polyester-polyurethane hybrid resin system. More precisely, the invention relates to a conventional hybrid resin as described in any of the above-referenced patents. In the present invention, the improvement lies in the use of novel and non-obvious free radical polymerization inhibitor(s).

The stability of the hybrid resin system is synonymous with the storage life (i.e. shelf life) of the B-Side component since the A-Side and B-Side components are stored separately until the time of use.

The A-Side component is not subject to instability, and can be readily stored for extended periods of time. However, the B-Side is prone to instability, and therefore tne inherent instability of the resin system resides in the B-Side. In order to extend the shelf-life of the hybrid resin system, one skilled in the art must extend the stable life of the B-Side component.

The improved inhibitors of the present invention are substituted hindered phenol type compounds with ring substituents that produce activated benzylic hydrogens, nitrophenols (with or without benzylic-type substituents), naphthoquinones, stabilized radical compounds, and mixtures thereof. It should be noted that if the above substituent produces activated benzylic hydrogens, activation of the benzylic hydrogen is achieved through ring substituents such as nitro groups and/or alpha heteroatom containing substituents such as amino nitrogen groups, alkoxy groups, or this groups.

The new inhibitors may be added to the B-Side as a solution in ethylenically saturated monomer along with the other additives. However, the method of incorporation is not significant.

DETAILED DESCRIPTION OF THE INVENTION

As described above, the A-Side of the invention comprises a multifunctional isocyanate and an optional free radical initiator system as is typically known in the art. The isocyanate compound must have at least two NCO functional groups per molecule, and be capable of reacting with the amine compound of the polyester polyol. The A-Side optionally contains any suitable chain extender described in the referenced patents. Examples of suitable isocyanate compounds include, but are not limited to the following: 4,4-diphenylmethylene diisocyanate (MDI), polycarbodiimide-modified diphenylmethane diisocyanate, polymethylene polyphenylisocyanate (PMPPI), 2,4- and 2,6-toluenediisocyanate (TDI), naphthalene diisocyanate, metaphenylene diisocyanate, isophorone diisocyanate, hexamethylene diisocyanate, and mixtures thereof. Preferred isocyanates aromatic and liquid at room temperature. The most preferred isocyanates of the present invention are polymeric MDI's and PMPPI's.

The free radical initiators useful in producing hybrid products, when mixed with the B-Side, initiate the formation of free radicals which enable network development via vinyl addition polymerization. These free radical initiators are well-known to those skilled in the art, and include organic peroxides, peroxyesters, peroxycarbonates, peroxyketals, azo compounds, or any other suitable compound capable of initiating vinyl addition polymerization. Examples include, but are not limited to: benzoyl peroxide, methyl ethyl ketone peroxide, di-t-butylperoxide, dilauroyl peroxide, dicumyl peroxide, cumene hydroperoxide, t-butyl peroxypivalate, t-amyl peroxy2-ethylhexanoate, t-butyl peroxy isopropyl carbonate, and 2,2'-azobis-isobutyronitrile. For typical hybrid systems, benzoyl peroxide is preferred.

Optionally, promoters can be employed to control the rate of the free radical initiation. Typical promoters include, but are not limited to: N,N-diethylaniline, N,N-dimethylaniline, N,N-dimethyl-p-toluidine, N,N-dimethylacetoacetamide, cobalt octoate, and cobalt naphthenate.

The B-Side composition comprises (1) an ethylenically unsaturated monomer solution having dissolved therein about 20–90 weight percent (preferably 30–90) of a polyester polyol having at least one ethylenically unsaturated group per molecule which has predominantly hydroxyl end groups, and (2) at least one additive having amine functionality. The amine compound will function as any of the following: a catalyst for the isocyanate reactions, chain extenders, nucleating agents, and so forth.

The B-Side optionally contains additional catalysts, surfactants, pigments, dispersing aids, and fillers, all commonly known in the art.

The ethylenically unsaturated monomers useful in the present invention can be any ethylenically unsaturated monomer capable of copolymerizing with the unsaturated polyester polyol to form a crosslinked polymer network. Examples include, but are not limited to: o-, m-, p-methyl styrene, methyl acrylate or methacrylate, t-butyl styrene, divinyl benzene, diallyl phthalate, triallyl cyanurate, and mixtures thereof. Preferably, the monomer employed is styrene.

The unsaturated polyester polyol has at least one ethylenically unsaturated group per molecule and predominantly hydroxyl end groups and preferably an acid number less than five. For example, an oligomer of an alpha, beta-ethylenically unsaturated dicarboxylic acid compound obtained by the condensation reaction of one or more saturated di- or polycarboxylic acid or ahhydride and/or one or more unsaturated di- or polycarboxylic acid or anhydride with an excess of glycols or polyhydric alcohols.

The unsaturated polyester polyol can be prepared from unsaturated di or polycarboxylic acid(s) or anhydride(s) with an excess of glycols and/or polyhydric alcohol(s). The polyols typically have equivalent weights, on a 100% solids basis, of between about 250 to about 1000. Examples of suitable saturated di- or polycarboxylic acids include, but are not limited to: isophthalic, orthophthalic, terephthalic, adipic, succinic and sebacic acid, and mixtures thereof.

Typical unsaturated carboxylic acids or anhydrides include, but are not limited to: maleic acid, fumaric acid, citaconic acid, chloromaleic acid allyl succinic acid, itaconic acid, mesaconic acid, and anhydrides thereof, and mixtures thereof. Maleic anhydride being the preferred choice.

Examples of glycols and polyhydric alcohols of the present invention include, but are not limited to: neopentyl glycol, ethylene glycol, diethylene glycol, triethylene glycol, propylene glycol, dipropylene glycol, 1,4-butanediol, polyethylene glycol, glycerol, mannitol, 1,2-propanediol, pentaerythritol, 1,6-hexanediol, 1,3-butanediol, and mixtures thereof.

Examples of tertiary amine catalysts for promotion of the isocyanate reactions include, but are not limited to the following: N,N-dimethylaminoethanol, triethanolamine, tris(dimethyl aminopropyl) amine, N,N-dimethylcyclohexylamine, bis-(2-methyl aminoethyl) ether, N,N-dimethylbenzylamine, triethylamine, N-methylmorpholine, N-ethylmorpholine, diaminobicyclooctane and mixtures thereof.

Primary amine chain extenders are commonly used in the polyurethane art. They include, but are not limited to: diethyltoluenediamine, phenylene diamines, toluenediamines, methylene dianiline, polymethylene polyphenylene amines, isophoronediamine, hexamethylenediamine, bis-hexamethylenetriamine, 1,2-propylenediamine, as well as mixtures thereof. Polymers with two or more terminal amino groups, such as polyoxypropylenediamines and polydimethylsiloxanediamines, are also useful as chain extenders.

The polymerization inhibitor of the amino end functionalized polymers of the present invention include hindered phenol type compounds with at least one ring substituent that produce activated benzylic hydrogens, nitrophenols, naphthoquinones, stabilized radical compounds, and mixtures thereof. Again, if benzylic hydrogen is the chosen substituent, activation of the benzylic hydrogen is achieved through ring substituents such as nitro groups and/or alpha substituents such as amino nitrogen groups.

The preferred inhibitors of the present invention include 2,6-di-tert-butyl-N,N-dimethylamino-p-cresol and 2-sec-butyl-4,6-dinitrophenol. The inhibitor is added to the polyester B-Side at concentrations, based on the polyester component, of at least about 10 ppm. Preferably, the inhibitor concentration is about 200 ppm to about 2000 ppm, most preferably, about 200 to about 400 ppm.

Prior art hybrid resin B-Side mixtures that do not employ the present invention do not exhibit practical shelf-life storage stability. The storage stability of a hybrid resin mixture is found to be strongly influenced by temperature, as shown in Table I.

TABLE I

| temperature (°C.) | time to gelation (days) |
|---|---|
| 25 | 120+ |
| 49 | 12 |
| 70 | 2 |

It is seen that there is a rapid decrease in stability as the temperature is steadily increased. The data indicates that ambient storage conditions must be tightly controlled to ensure long life of these hybrid resin mixtures.

An accelerated storage stability test protocol is used to evaluate the effectiveness of the inhibitor. The test is run at 70° C. (158° F.) and is understood that five day stability at 70° C. extrapolates to six month stability at typical ambient temperatures, which are ideally 25° C. An inhibitor concentration of 1000 ppm was considered a good barometer to determine whether the composition exhibited improved storage stability. In this test, samples without any additional inhibitor, or with ineffective inhibitors are seen to have a storage stability of one to two days. As can be seen from Table II, the inhibitors of the present invention exhibit increased storage stabilities of approximately 50% or more under the above conditions.

TABLE II

| inhibitor | stability (days) |
|---|---|
| no added inhibitor | 2 |
| 2,6-di-t-butyl-4-methylphenol | 2 |
| 4-t-butylcatechol | 2 |
| tetrakis(methylene(3,5-di-t-butyl-4-hydroxyhydrocinnamate))methane | 2 |
| octadecyl3,5-di-t-butyl-4-hydoxyhydrocinnamate | 2 |
| 2,2'-ethylidene-bis(4,6-bis(1,1-dimethylethyl)phenol | 2 |
| triethylene glycol bis(3-(3'-t-butyl-4'-hydroxy-5'-methylphenyl)proprionate) | 2 |

TABLE II-continued

| inhibitor | stability (days) |
|---|---|
| 4-((4,6-bis(octylthio)-S-triazin-2-yl)amino-2,6-di-t-butylphenol | 2 |
| tris(2,4-di-t-butylphenyl)phosphite | 2 |
| proprietary mixture of phenylenediamines | 2 |
| 2-t-butyl-6-(3'-t-butyl-5'-methyl-2'-hydroxybenzyl)-4-methylphenyl acrylate | 2 |
| tocopherol mixture | 2 |
| hydroquinone | 2 |
| p-benzoquinone | 2 |
| 2,6-di-sec-butylphenol | 2 |
| 2,6-diisopropylphenol | 2 |
| 2,6-diphenylphenol | 2 |
| 4-nitro-2,6-diphenylphenol | 2 |
| 3,5-di-t-butyl-4-hydroxycinnamic acid | 2 |
| 3,5-di-t-butyl-4-hydroxybenzaldehyde | 2 |
| 3,5-di-t-butyl-4-hydroxybenzoic add | 2 |
| 2,6-di-t-butyl-4-ethylphenol | 2 |
| 4,4'-methylenebis(2,6-di-t-butylphenol) | 2 |
| 1,3,5-trimethyl-2,4,6-tris(3,5-di-t-butyl-4-hydroxybenzyl)benzene distearyl thiodipropionate | 2 |
| 2,6-di-t-butyl-4-methoxyphenol | 3 |
| 2,2,6,6-tetramethyl-1-piperidinyloxy radical | 6 |
| bis(1-oxyl-2,2,6,6-tetramethylpiperidine-4-yl)sebacate | 6 |
| 1,4-naphthoquinone | 8 |
| 1,2-naphthoquinone | 8 |
| 2-methyl-1,4-naphthoquinone | 10 |
| 2,4-dinitrophenol | 16 |
| 3,5-di-t-butyl-4-hydroxybenzyl alcohol | 17 |
| 2,6-di-t-butyl-N,N-dimethylamino-p-cresol | 17 |
| 2,6-di-t-butyl-α-(3,5-di-t-butyl-4-oxo-2,5-cyclohexadien-1-ylidene)-p-tolyloxy radical | 18 |
| 2-sec-butyl-4,6-dinitrophenol | 30 |

TABLE III

| inhibitor | concentration (ppm) | stability (days) |
|---|---|---|
| 2,6-di-t-butyl-N,N-dimethylamino-p-cresol | 0 | 2 |
| 2,6-di-t-butyl-N,N-dimethylamino-p-cresol | 100 | 2 |
| 2,6-di-t-butyl-N,N-dimethylamino-p-cresol | 250 | 5 |
| 2,6-di-t-butyl-N,N-dimethylamino-p-cresol | 500 | 11 |
| 2,6-di-t-butyl-N,N-dimethylamino-p-cresol | 750 | 15 |
| 2,6-di-t-butyl-N,N-dimethylamino-p-cresol | 1000 | 17 |
| 2-sec-butyl-4,6-dinitrophenol | 0 | 2 |
| 2-sec-butyl-4,6-dinitrophenol | 100 | 6 |
| 2-sec-butyl-4,6-dinitrophenol | 250 | 9 |
| 2-sec-butyl-4,6-dinitrophenol | 400 | 17 |
| 2-sec-butyl-4,6-dinitrophenol | 1000 | 30 |

Of the inhibitors screened for activity, only certain classes are effective in imparting long term stability to the hybrid resin B-Side mixture. While applicants do not wish to be bound to any definitive theory, it appears the inhibitors must possess some structural elements that enable it to act effectively. The inhibitors of the present invention share a common characteristic in that their main mechanism of inhibition is through termination of alkyl radicals. This mechanism is well known in the art, and is described in literature such as by Denisov in the *Handbook of Antioxidants*. This mechanism is particularly relevant since the instability is due to premature polymerization of the unsaturated polyester and styrene components, and this polymerization is propagated by styryl radicals. Efficient termination of the styryl radicals leads to excellent storage stability of the mixture. Inhibitors that are known to act via a different mechanism than alkyl radical termination, such as chain termination of peroxy radicals or the non-radical generating decomposition of peroxides have been shown to be ineffective inhibitors for hybrid resin B-Side mixtures. Examples of inhibitors that function through these non-alkyl radical termination pathways include phenols such as 2,6-di-t-butyl-4-methylphenol, aromatic amines such as phenylenediamines, phosphites such as tris(2,4-di-t-butylphenyl)phosphite, and thioethers such as distearyl thiodipropionate.

As expected, the effectiveness of the inhibitors is strongly dependent on the concentration in which it is added (see Table III). It was observed that the 2-sec-butyl-4,6-dinitrophenol and 2,6-di-t-butyl-N,N-dimethylamino-p-cresol were both highly effective. However, the 2-sec-butyl-4,6-dinitrophenol inhibitor is more effective by weight.

TABLE IV

| inhibitor | concentration (ppm) | stability (days) |
|---|---|---|
| 2,6-di-t-butyl-N,N-dimethylamino-p-cresol | 100 | 2 |
| 2-sec-butyl-4,6-dinitrophenol | 100 | 6 |
| 2,6-di-t-butyl-N,N-dimethylamino-p-cresol + 2-sec-butyl-4,6-dinitrophenol | 100 each | 7 |
| 2,6-di-t-butyl-N,N-dimethylamino-p-cresol | 250 | 5 |
| 2-sec-butyl-4,6-dinitrophenol | 250 | 9 |
| 2,6-di-t-butyl-N,N-dimethylamino-p-cresol + 2-sec-butyl-4,6-dinitrophenol | 250 each | 11 |

Table IV illustrates the synergistic effects of the system components on stability. No synergistic effects were found for the two inhibitors screened. This supports the likelihood that each acts via the same mechanistic pathway to provide stabilization.

TABLE V

| sample | stability (days) |
|---|---|
| polyester resin, no additives | 29 |
| hybrid resin | 2 |
| polyester resin + peroxide promoter (@ 0.2%) | 26 |
| polyester resin + silicone surfactant (@ 2.0%) | 26 |
| polyester resin + tin catalyst (@ 0.5%) | 26 |
| polyester resin + aromatic amine (@ 2.2%) | 16 |
| polyester resin + aliphatic tertiary amine (@ 0.4%) | 6 |

Table V shows an analysis on the components of the B-Side to determine which compromise the stability of the polyester. The hybrid resin used for evaluation comprised an unsaturated polyester polyol, an aromatic amine chain extender, an aliphatic tertiary amine catalyst, a tin catalyst, a silicone surfactant and a peroxide promoter. The effect of adding each of the components one at a time was studied. The results are shown above in Table V. The data shows that the unsaturated polyester resin alone is stable. The addition of the aromatic primary amine or the aliphatic tertiary amine significantly decreases the stability. The remaining components of the system have little effect on the system's stability.

TABLE VI

| sample | stability (days) |
|---|---|
| hybrid resin | 2 |
| hybrid resin minus peroxide promoter | 2 |
| hybrid resin minus silicone surfactant | 2 |
| hybrid resin minus tin catalyst | 3 |
| hybrid resin minus aliphatic tertiary amine | 4 |
| hybrid resin minus aromatic amine | 8 |

TABLE VI-continued

| sample | stability (days) |
|---|---|
| hybrid resin minus aromatic amine and tertiary amine | 30 |

Table VI illustrates the synergistic effects of the system components. Each component was removed one at a time from the system. Again, it was determined that removing either of the two amines is critical. Significant increases in stability occur. The results show the two types of amines act in concert to decrease the stability of the system.

The data in Tables V and VI indicate that the aromatic primary and the aliphatic tertiary amine are the sources of instability in the hybrid resin system. Other compounds with similar functionality were evaluated for their effect on the system. The results are shown in Table VII.

TABLE VII

| sample | stability (days) |
|---|---|
| hybrid resin | 2 |
| polyester resin | 29 |
| polyester resin + diethyltoluenediamine | 16 |
| polyester resin + aniline | 17 |
| polyester resin + isophoronediamine | 17 |
| polyester resin + 1,4-phenylenediamine | 16 |
| polyester resin + tris(dimethyl aminopropyl) amine | 6 |
| polyester resin + triethylamine | 6 |
| polyester resin + bis-(2-methyl aminoethyl) ether | 6 |
| polyester resin + diethyltoluenediamine + tris(dimethyl aminopropyl) amine | 3 |
| polyester resin + diethyltoluenediamine + triethylamine | 3 |
| polyester resin + diethyltoluenediamine + bis-(2-methyl aminoethyl) ether | 3 |
| polyester resin + tris(dimethyl aminopropyl) amine + isophoronediamine | 2 |
| polyester resin + tris(dimethyl aminopropyl) amine + aniline | 2 |
| polyester resin + tris(dimethyl aminopropyl) amine + poly(propylene glycol) bis(2-aminopropyl ether) | 2 |
| polyester resin + tris(dimethyl aminopropyl) amine + aliphatic triamine epoxy hardener | 2 |

The data indicates that either a primary amine or an aliphatic tertiary amine, acting alone, reduce stability. The tertiary amine will have a greater effect. Table VII shows that the problem is not limited to the original amines studied. Rather, the phenomena is common to these particular classes of primary and tertiary aliphatic amines and combinations thereof. The prior art hybrid resin systems' main ingredients include these amines, and therefore are all inherently unstable. This instability is functionally related to the concentration of the instability creating amines. In the present invention the problematic instability of these systems is significantly reduced, if not eliminated.

I claim:

1. A polyurethane-polyester hybrid resin system comprising the reaction product of:
   (a) an A-Side composition comprising:
      (i) an isocyanate compound having at least two NCO groups per molecule, and
      (ii) a free radical initiator; and
   (b) a B-Side composition comprising:
      (i) an ethylenically unsaturated monomer having dissolved therein a polyester polyol having at least one ethylenically unsaturated group per molecule and having predominantly hydroxyl end groups,
      (ii) at least one additive having amine functionality, and
      (iii) at least about 250 ppm 2,6-di-butyl-N,N-dimethylamino-p-cresol.

2. A B-Side composition comprising:
   (a) an ethylenically unsaturated monomer having dissolved therein a polyester polyol having at least one ethylenically unsaturated group per molecule and having predominantly hydroxyl end groups;
   (b) at least one additive having amine functionality; and
   (c) at least about 250 ppm 2,6-di-t-butyl-N,N-dimethylamino-p-cresol.

3. A B-Side composition comprising:
   an ethylenicallv unsaturated monomer having dissolved therein a polyester polyol having at least one ethlenicallv unsaturated group per molecule and having predominantly hydroxyl end groups:
   (b) at least one additive having amine functionality; and
   (c) at least about 100 ppm 2-sec-butyl-4,6-dinitrophenol.

4. A B-Side composition according to claim 2 wherein the concentration of the 2,6-di-t-butyl-N,N-dimethylamino-p-cresol is at least about 1000 ppm.

5. A B-Side composition according to claim 2 wherein the concentration of the 2,6-di-t-butyl-N,N-dimethylamino-p-cresol is about 1000–2000 ppm.

6. A B-Side composition according to claim 3 wherein the concentration of the 2-sec-butyl-4,6-dinitrophenol is at least about 200 ppm.

7. A B-Side composition according to claim 3 wherein the concentration of the 2-sec-butyl-4,6-dinitrophenol is at least about 1000 ppm.

8. A B-Side composition according to claim 3 wherein the concentration of the 2-sec-butyl-4,6-dinitrophenol is about 1000–2000 ppm.

* * * * *